(12) United States Patent
Kim et al.

(10) Patent No.: US 6,807,674 B2
(45) Date of Patent: Oct. 19, 2004

(54) DISK CARTRIDGE

(75) Inventors: Seok-jung Kim, Gyeonggi-do (KR);
Heui-jong Kang, Gyeonggi-do (KR);
Han-kook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/987,896

(22) Filed: Nov. 16, 2001

(65) Prior Publication Data

US 2002/0172128 A1 Nov. 21, 2002

(30) Foreign Application Priority Data

May 16, 2001 (KR) ........................................ 2001-26785

(51) Int. Cl.[7] .......................... G11B 7/24; G11B 23/03; G11B 33/02
(52) U.S. Cl. ..................... 720/720; 720/728; 369/77.21
(58) Field of Search .............................. 360/131, 132, 360/133; 369/77.2, 272, 287, 289, 292, 77.21; D14/474, 478, 479, 480; 720/718, 720, 725, 728

(56) References Cited

U.S. PATENT DOCUMENTS

| | | | | |
|---|---|---|---|---|
| 4,926,411 A | * | 5/1990 | Ouwerkerk et al. | 360/133 |
| 5,237,560 A | * | 8/1993 | Tani et al. | 360/133 |
| 5,867,476 A | * | 2/1999 | Yoshida et al. | 360/133 |
| 5,995,345 A | * | 11/1999 | Overbo | 360/133 |
| 6,057,995 A | * | 5/2000 | Yamashita et al. | 360/133 |
| 6,407,981 B1 | * | 6/2002 | Cho et al. | 369/289.1 |
| 6,430,147 B1 | * | 8/2002 | Goto et al. | 369/289.1 |
| 6,504,679 B1 | * | 1/2003 | Ohta | 360/133 |
| 6,538,984 B2 | * | 3/2003 | Sanada et al. | 369/291.1 |
| 2001/0022765 A1 | * | 9/2001 | Sanada et al. | 369/75.21 |

FOREIGN PATENT DOCUMENTS

JP 6-76524 3/1994

* cited by examiner

*Primary Examiner*—Julie Anne Watko
(74) *Attorney, Agent, or Firm*—Staas & Halsey LLP (57) ABSTRACT

A disk cartridge accommodating a disk includes a case receiving the disk and having openings. A shutter opens and/or closes the openings, where the openings deviate a predetermined distance from a middle position of the case toward one side.

19 Claims, 8 Drawing Sheets

DISK CARTRIDGE

CROSS-REFERENCE TO RELATED APPLICATIONS

This application claims the benefit of Korean Application No. 2001-26785, filed May 16, 2001, in the Korean Industrial Property Office, the disclosure of which is incorporated herein by reference.

BACKGROUND OF THE INVENTION

1. Field of the Invention

The present invention relates to a disk cartridge for receiving an information recording/reproducing medium, and more particularly, to a disk cartridge in which structures of openings for a pick-up providing access to a disk are improved so that a size of the disk cartridge can be advantageously reduced.

2. Description of the Related Art

Figure 1:
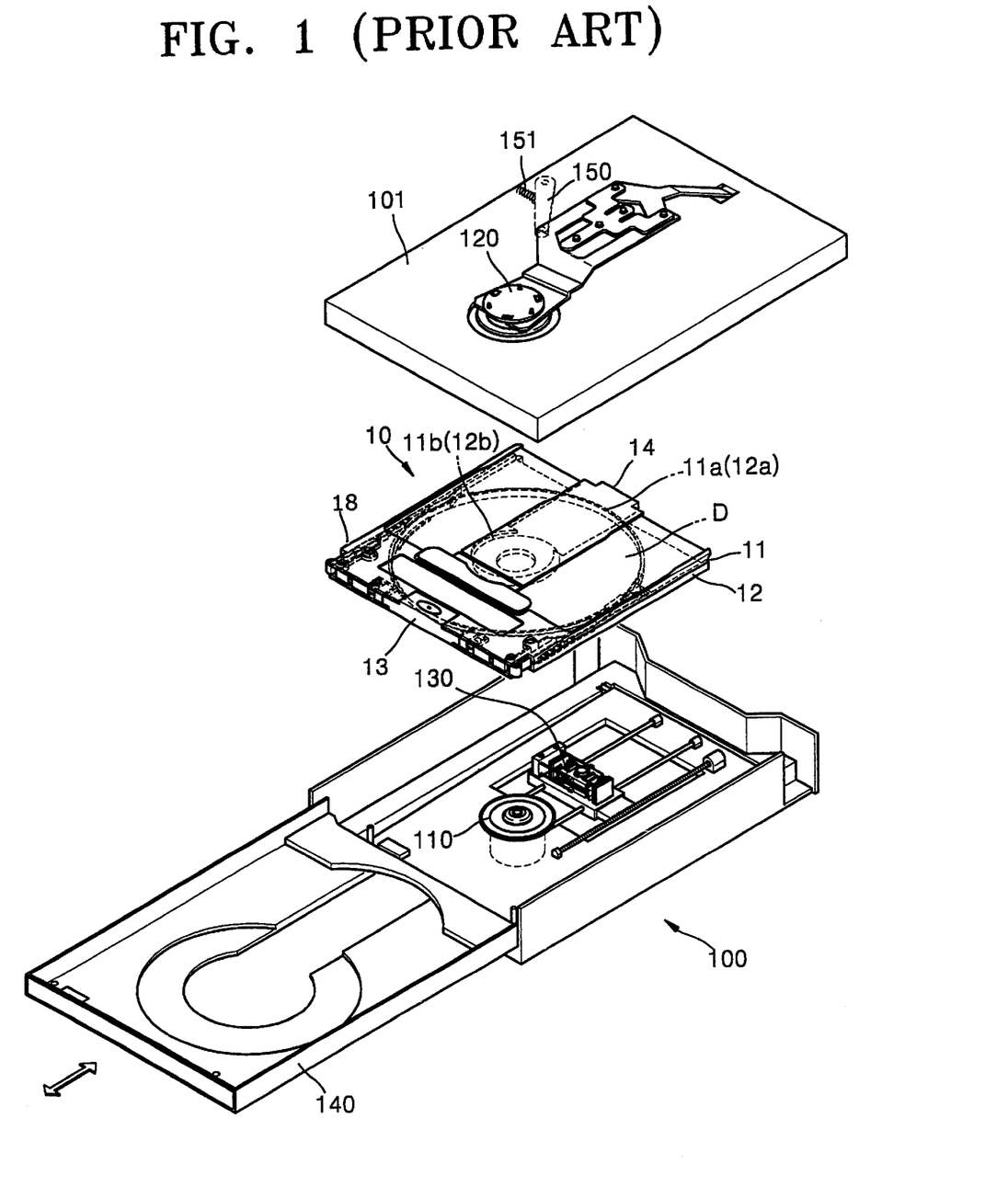
FIG. 1 is a perspective view illustrating a conventional disk cartridge in a recording/reproducing apparatus.
Figure 2:
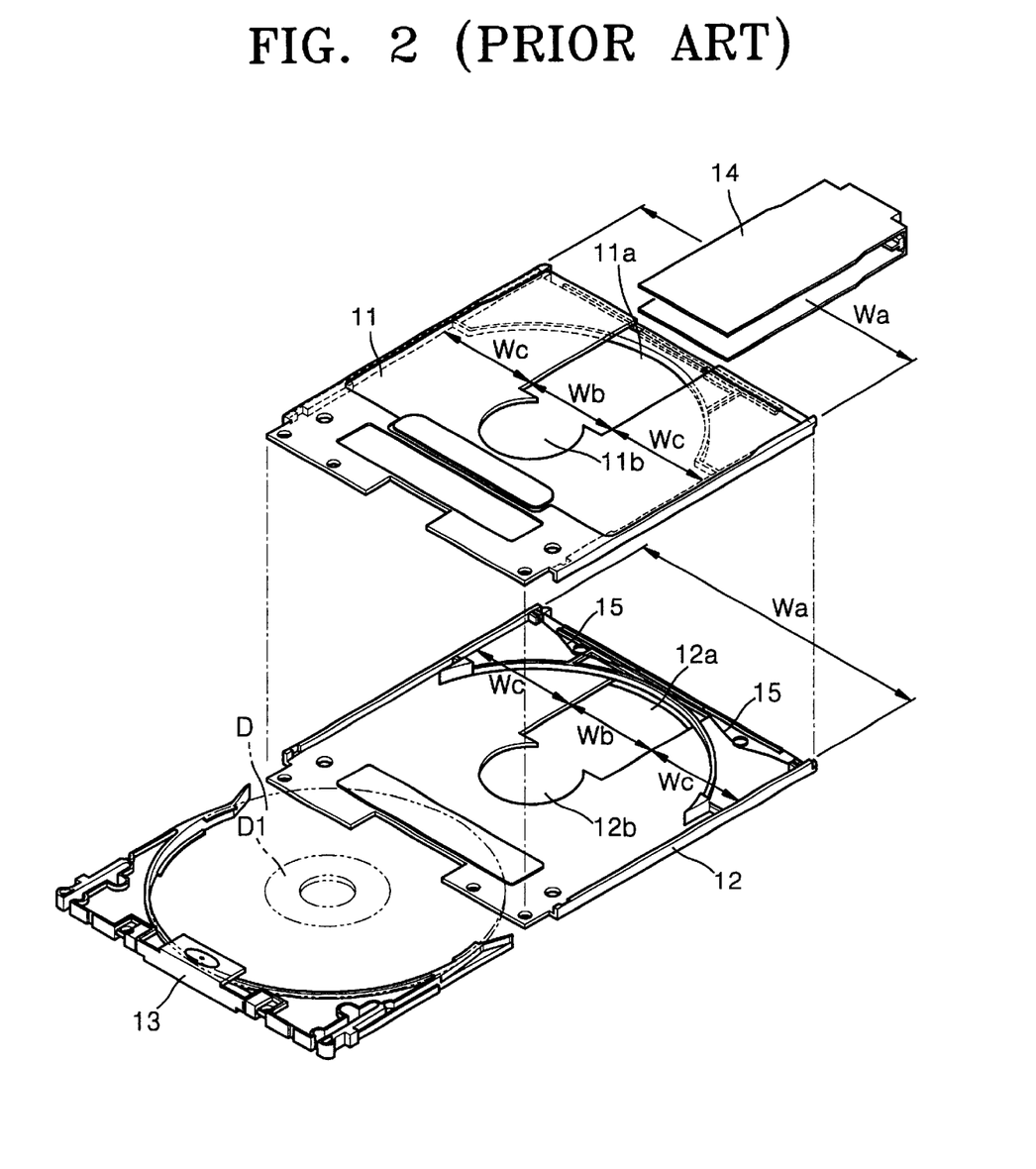
FIG. 2 is an exploded perspective view illustrating the disk cartridge shown in FIG. 1.

In general, as shown in FIGS. 1 and 2, a disk cartridge 10 is intended to receive a disk D to be used in a recording/reproducing apparatus 100. The disk cartridge 10 includes a case 18 having upper and lower portions 11 and 12 which form an internal space for receiving the disk D, a holder 13 which is inserted into and joined to the case 18 having the upper and lower portions 11 and 12 while supporting the disk D, and a shutter 14 for selectively opening and closing openings 11a and 12a formed through the case 18 having the upper and lower portions 11 and 12 so that a pick-up 130 of the recording/reproducing apparatus 100 can have access to the disk D. Receiving holes 11b and 12b are formed to be connected to the openings 11a and 12a, respectively, so that a turntable 110 and a clamper 120 of the recording/reproducing apparatus 100 can clamp a clamper area D1 (See FIG. 2) of the disk D upward and downward. The receiving holes 11b and 12b are opened or closed by the opening and closing operations of the shutter 14.

Figure 3A:
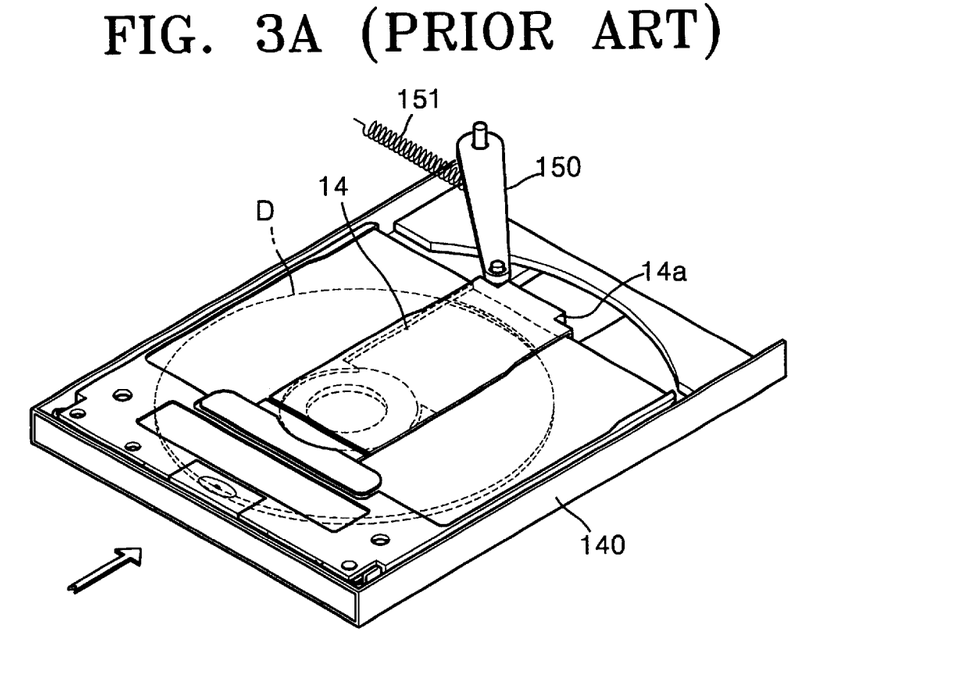
FIGS. 3A and 3B are perspective views illustrating a procedure of opening a shutter of the disk cartridge shown in FIG. 1.
Figure 3B:
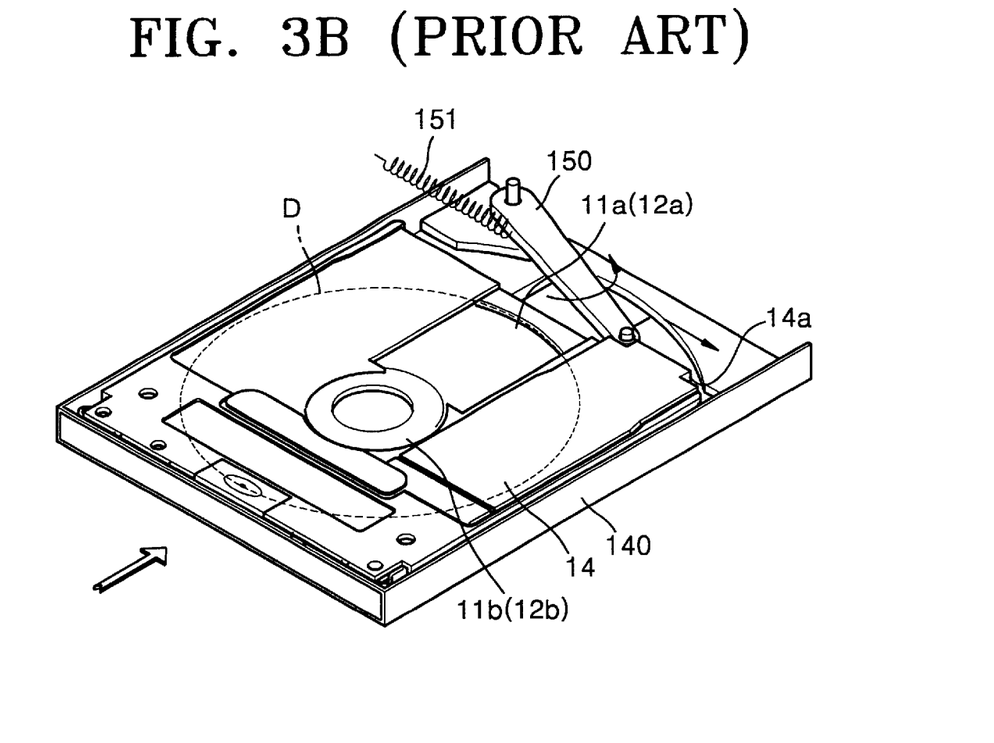

In addition, an opening lever 150 is installed on a cover 101 of the recording/reproducing apparatus 100 for opening and closing the shutter 14. As the disk cartridge 10 seated on a tray 140 moves into the recording/reproducing apparatus 100, one end of the opening lever 150 engages with an engagement portion 14a and opens the shutter 14 while the opening lever 150 pivots, as shown in FIGS. 3A and 3B. A spring 151 is provided for restoring the opening lever 150 to an original position when the cartridge 10 is moved out of the recording/reproducing apparatus 100.

Recently, a size of the disk D has been gradually reduced, and a recording density of the disk D has increased. Also, the apparatus 100 for recording on/reproducing from the disk D tends to be smaller, and therefore the disk cartridge 10 for receiving the disk D is required to be smaller. However, as shown in FIG. 2, widths Wb of the openings 11a and 12a for the pick-up 130 to have access to the disk D, as described above, and reserved spaces Wc for the opening/closing operations of the shutter 14, are required to be included in an overall width Wa when determining the size of the cartridge 10.

Consequently, when a width of the shutter 14 and the widths Wb of the openings 11a and 12a are assumed to be nearly the same, it can be considered that an overall width Wa of the cartridge 10 needs to be at least 3 times the widths Wb of the openings 11a and 12a. Therefore, though a method of reducing the widths Wb of the openings 11a and 12a can be considered so as to make the cartridge 10 smaller, the widths Wb of the openings 11a and 12a cannot be reduced as desired because the openings 11a and 12a must allow the pick-up 130 to have access to the disk D. That is, if the cartridge is not intended to be used in a special recording/reproducing apparatus employing a very small pick-up, a width allowing a general-sized pick-up to have access to the disk D must be maintained. Therefore, a disk cartridge having a structure capable of reducing an overall size thereof without reducing the sizes of the openings 11a and 12a is desirable.

SUMMARY OF THE INVENTION

Various objects and advantages of the invention will be set forth in part in the description that follows and, in part, will be obvious from the description, or may be learned by practice of the invention.

To solve the above problem, it is an object of the present invention to provide an improved disk cartridge having a smaller overall size while maintaining conventional dimensions of openings.

Accordingly, to achieve the above and other objects of the invention, there is provided a disk cartridge accommodating a disk including a case for receiving the disk and having openings, and a shutter for opening/closing the openings, wherein the openings deviate a predetermined distance from a middle position of the case towards one side.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Hereinafter, an exemplary embodiment of the present invention will be described in greater detail with reference to the accompanying drawings. The same reference numerals used in the drawings denote same elements having the same functions.

Figure 4:
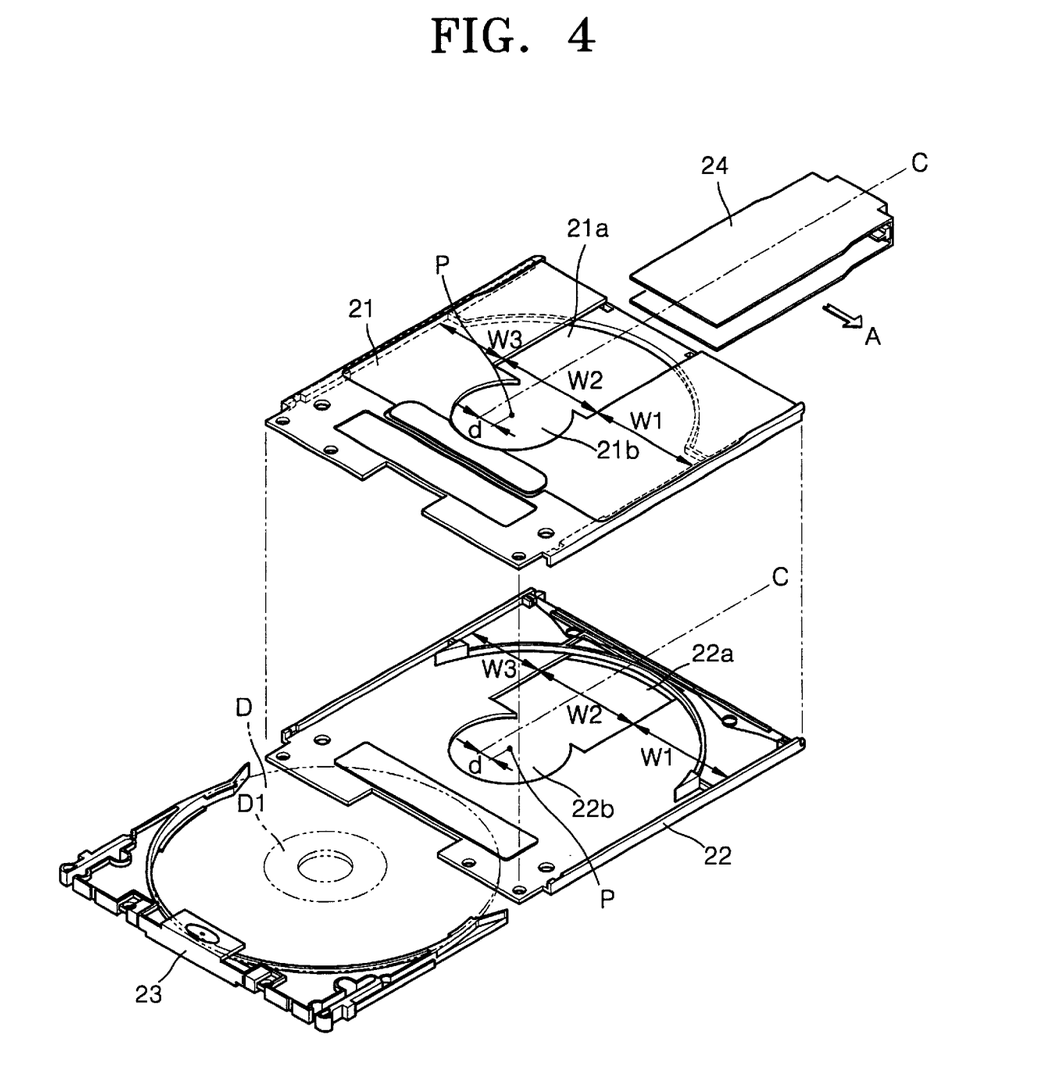
FIG. 4 is an exploded perspective view illustrating a disk cartridge according to the present invention.

FIG. 4 shows a disk cartridge according to the present invention. A disk cartridge 20 includes a case having upper and lower portions 21 and 22 forming a space for receiving a disk D, a holder 23 which is inserted into and joined to the case having the upper and lower portions 21 and 22 while supporting the disk D, and a shutter 24 for selectively opening and closing openings 21a and 22a, and receiving holes 21b and 22b formed at the upper and lower portions 21 and 22 of the case, respectively.

Center lines C of the openings 21a and 22a are positioned to deviate a predetermined distance d to one side from center points of the receiving holes 21b and 22b, where the center points are opposite each other. That is, the center lines C of the openings 21a and 22a are not positioned at a middle position of the case having the upper and lower portions 21 and 22. A first width, W1, and a third width, W3, of the upper and lower cases 21 and 22 are set to be different from each other (W1>W3) so that the openings 21a and 22a are formed to deviate to one side of the upper and lower cases 21 and 22, respectively, having a predetermined width, W2.

In addition, a shutter 24 slides in a direction opposite to a direction of the deviation as indicated by an arrow A in FIG. 4. The shutter 24 exposes or closes the openings 21a and 22a. Therefore, the first width W1 onto which the shutter 24 slides is longer than that of the case in which the openings 21a and 22a are positioned. When the disk cartridge 20 has a same size as a conventional cartridge, the first width W1 of the upper and lower cases 21 and 22 onto which the shutter 24 slides is longer than that of the conventional upper and lower cases 21 and 22. In other words, when the first width W1 onto which the shutter 24 slides when the openings 21a and 22a are opened, is set to be the same as in the conventional art, the size of the disk cartridge 20 can be made smaller than the conventional cartridge 10. When the openings 21a and 22a are formed to be deviated toward one side so that the shutter 24 slides in a direction opposite to the direction of deviation to open the openings 21a and 22a, sizes of the openings 21a and 22a and the shutter 24 for opening/closing the openings 21a and 22a remain unchanged while the disk cartridge 20 is made smaller than the conventional cartridge 10.

Figure 5:
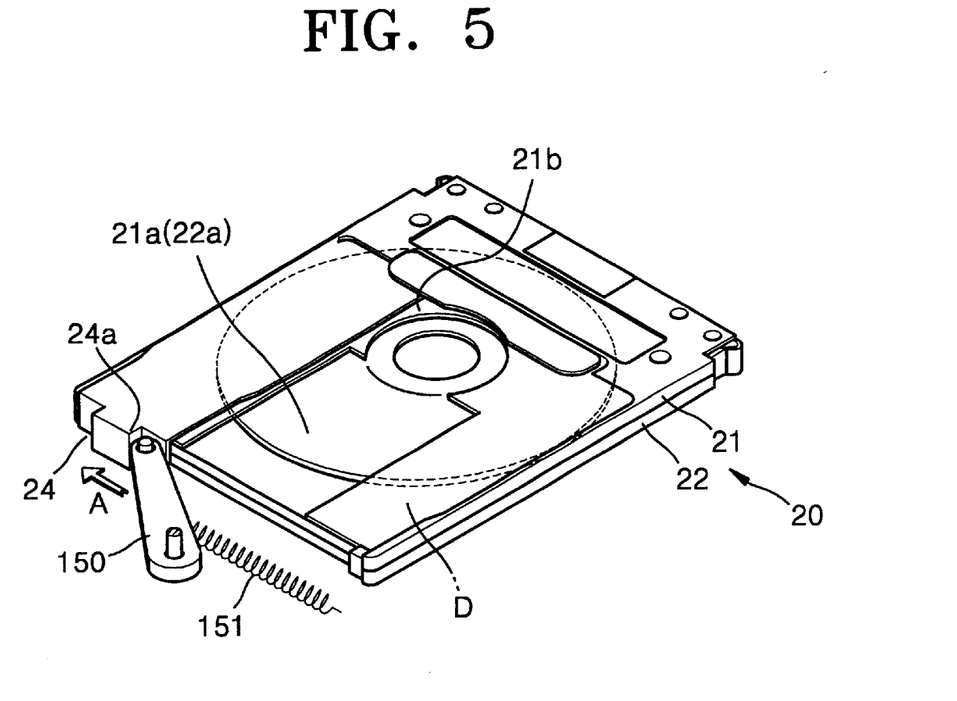
FIG. 5 is a perspective view illustrating a procedure of opening a shutter of the disk cartridge shown in FIG. 4.
Figure 6:
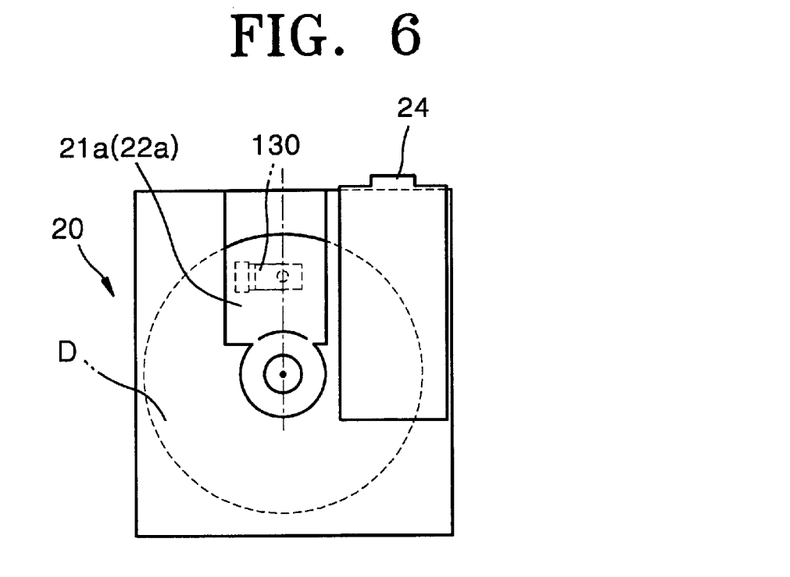
FIG. 6 is a plan view illustrating the procedure of opening the shutter of the disk cartridge shown in FIG. 4.

Referring to FIG. 5, when the disk cartridge 20 configured as above is seated on the tray 140 (FIG. 1), and is inserted into the recording/reproducing apparatus 100 (FIG. 1), one end of the opening lever 150 engages with an engagement portion 24a and opens the shutter 24. The opening lever 150 then pivots causing the shutter 24 to slide in a direction opposite to the direction to which the openings 21a and 22a are deviated. Thereafter, as shown in FIG. 6, the pick-up 130 has access to the disk D through the opened openings 21a and 22a and the recording/reproducing apparatus records/reproduces information on/from the disk D. Therefore, because the size of the disk cartridge 20 having a configuration in which the openings 21a and 22a are deviated toward one side, as in the present invention, can be reduced compared to the conventional disk cartridge 10 while the sizes of the openings 21a and 22a and the shutter 24 remain unchanged, compactness of the disk cartridge 20 and of the recording/reproducing apparatus 100 (FIG. 1) employing the disk cartridge 20 can be effectively achieved.

Figure 7:
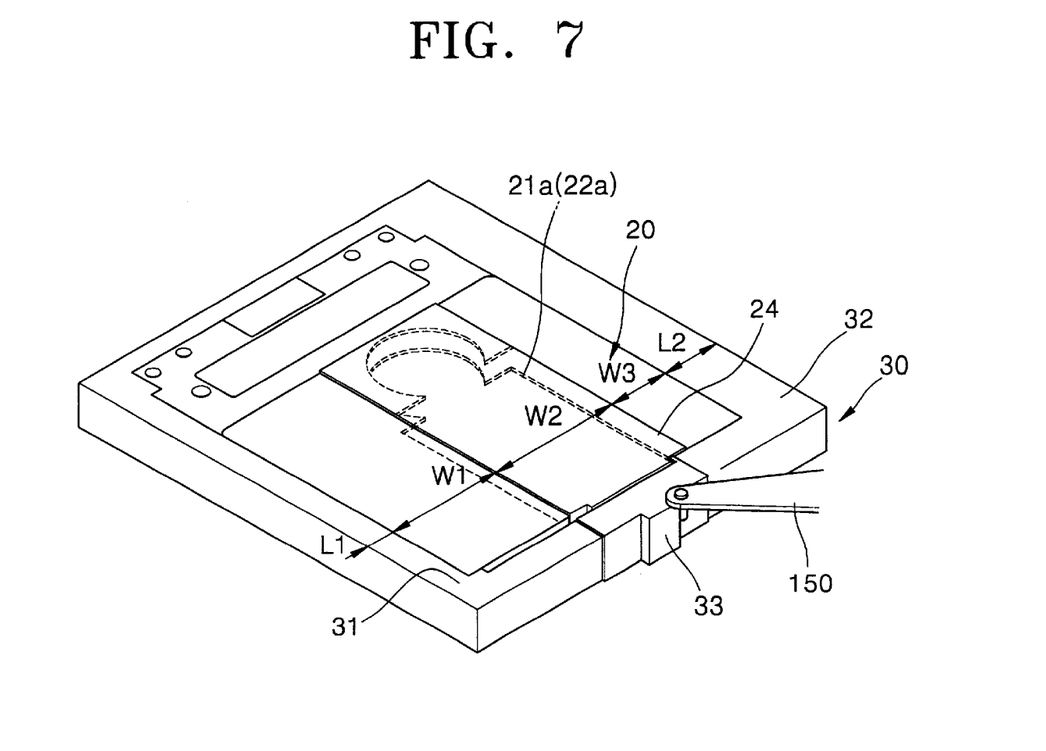
FIG. 7 illustrates an adapter for receiving the disk cartridge shown in FIG. 4 where first and second side walls of the adapter have different widths.
Figure 8:
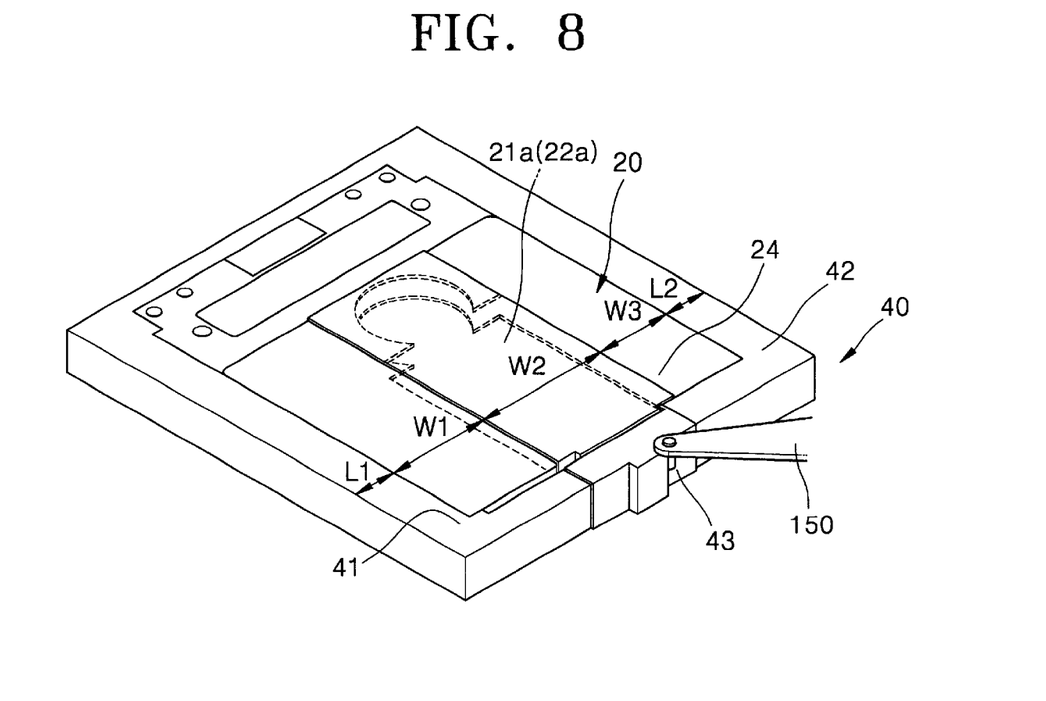
FIG. 8 illustrates the adapter for receiving the disk cartridge shown in FIG. 4 where the widths of the first and second side walls of the adapter are same.

In addition, when the above-described disk cartridge 20 is a small cartridge receiving, for example, an 80 mm disk, and is intended for use in a recording/reproducing apparatus for a large size disk, for example, a 120 mm disk, the disk cartridge 20 may be fitted to one of adapters 30 and 40 shown in FIGS. 7 and 8. Auxiliary shutters 33 and 43 each of which is joined to the shutter 24 of the disk cartridge 20, is slid by the opening lever 150 to open/close the shutter 24.

As shown in FIG. 7, an adapter 30 receives the disk cartridge 20 and is configured so that a width L1 of a first arm of the adapter 30 and a width L2 of a second arm of the adapter 30 are set to be different widths. The difference in widths is intended to cause the widths L1 and L2 of the first and second side walls to have a difference corresponding to the deviation of the openings 21a and 22a (L1<L2). Thus, when the disk cartridge 20 is joined to the adapter 20, the deviation of the openings 21a and 22a can be offset by the difference in widths and the openings 21a and 22a can be positioned at a middle position of the adapter 30. That is, as shown in FIG. 7, when a first section of the disk cartridge 20 has a first width W1 and a second section of the disk cartridge 20 has a width W3, and the widths of the first and second side walls 31 and 32 of the adapter 30 are L1 and L2, L1+W1=L2+W3 is satisfied. The adapter 30 compensates for the deviation of the openings 21a and 22a when the recording/reproducing apparatus 100 permits the disk cartridge 20 having the openings 21a and 22a to be positioned at a center portion thereof.

The adapter 40 shown in FIG. 8 is configured so that the widths L1 and L2 of first and second side walls 41 and 42 of the adapter receiving the disk cartridge 20 are the same. Therefore, after the cartridge 20 is joined to the adapter 40, the openings 21a and 22a remain deviated toward one side. The adapter 40 can be used in a recording/reproducing apparatus that permits the disk cartridge 20 having the deviated openings 21a and 22a to be used therein when only the size of the disk cartridge 20 is enlarged to fit in the recording/reproducing apparatus. Therefore, when one of these adapters 30 and 40 is employed, the small disk cartridge 20, according to the present invention, can be used with ease in the recording/reproducing apparatus for a conventional disk.

Figure 9:
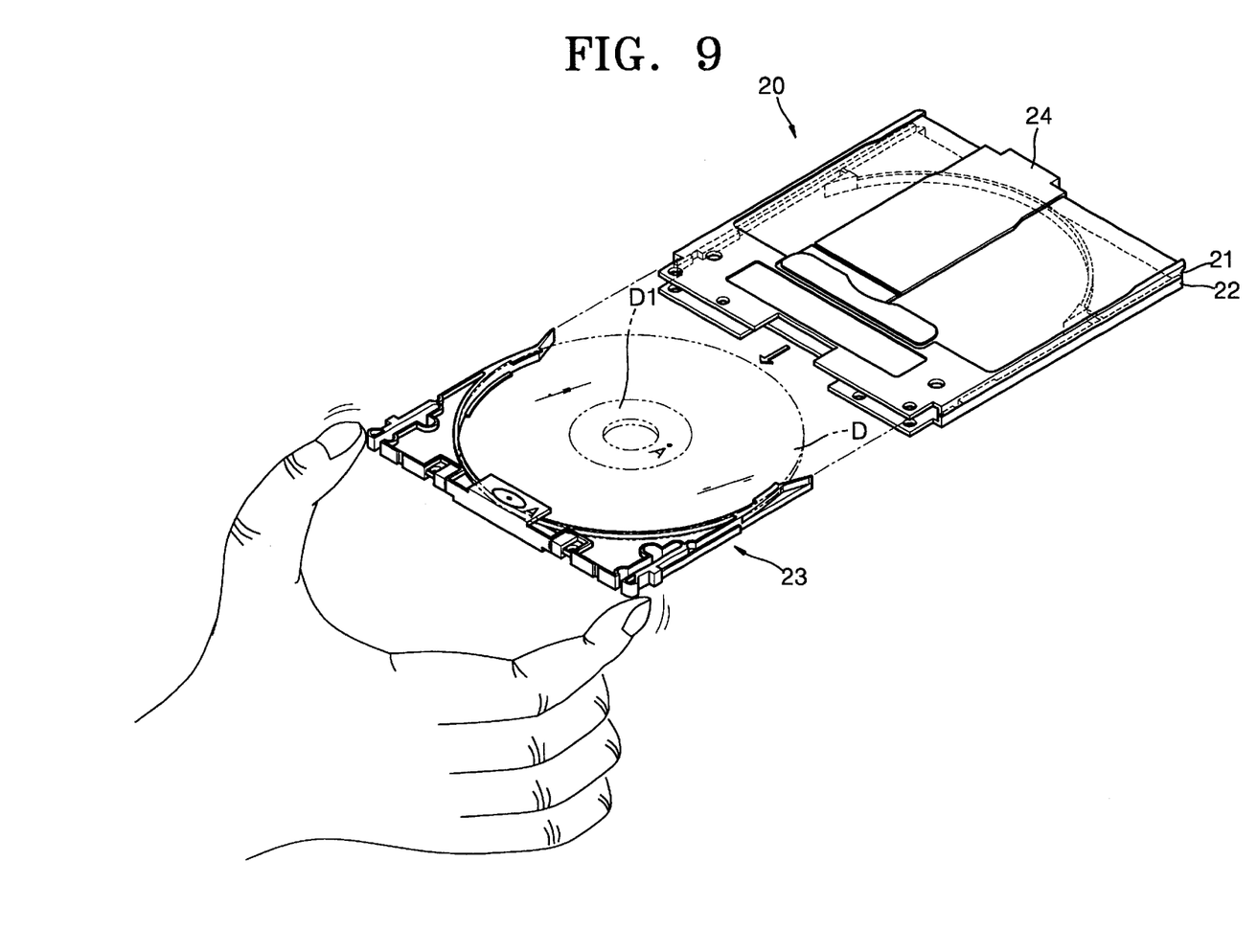
FIGS. 9 and 10 are perspective views illustrating a procedure of reversing a recorded/reproduced surface of an internal disk in the disk cartridge shown in FIG. 4.
Figure 10:
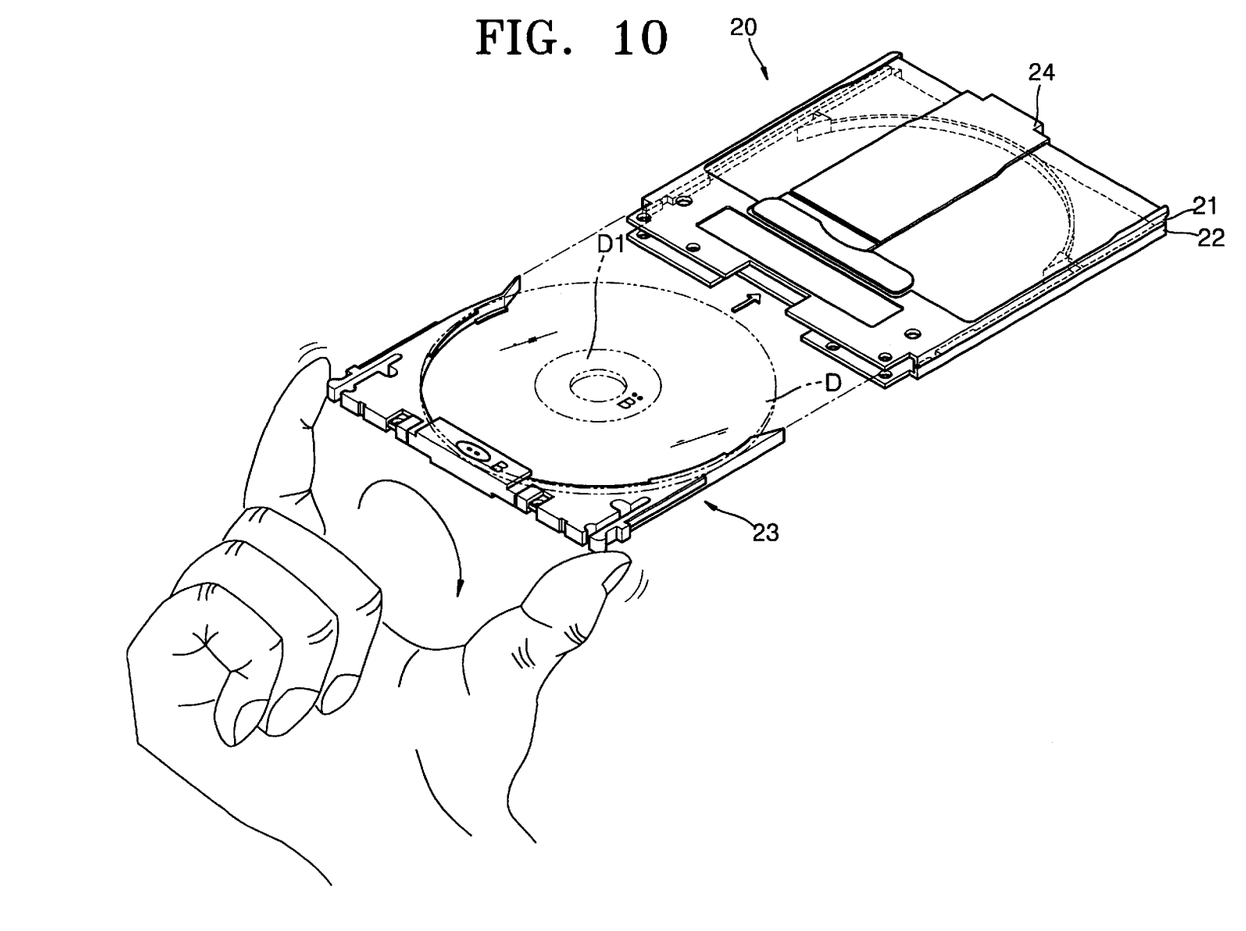

In addition, recently, a double-sided disk of which both sides are utilized is frequently used. In the disk cartridge according to the present invention, when it is necessary to change the disk D from one side to the other, the holder 23 is extracted from the case having the upper and lower portions 21 and 22 of the disk cartridge 20 as shown in FIG. 9, and is then reversed and joined to the case again as shown in FIG. 10. Because in this state the other side of the disk D can be used as the previous one, the double-sided disk may be used in the cartridge according to the present invention without any problems.

As described above, the disk cartridge 20 according to the present invention has a smaller size than conventional disk cartridges while the sizes of the openings 21a and 22a remain unchanged by forming the openings 21a and 22a to be deviated toward one side of the case and permitting the shutter 24 to move in a direction opposite to the direction of deviation.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A disk cartridge accommodating a disk, comprising:
a case receiving the disk and having openings; and a shutter opening/closing the openings, wherein the case comprises upper and lower portions, each comprising a first width W1 and a third width W3 being different from each other so that the openings having a second width W2 deviate a predetermined distance from a middle position of the case toward one side of the upper and lower portions, respectively, where a difference between the first width W1 and the third width W3 compensate for the deviation of the openings.

2. A disk cartridge accommodating a disk in a recording/reproducing apparatus comprising a pick-up, the disk cartridge comprising:

a case receiving the disk and having openings to enable the pick-up access of the disk; and a shutter opening/closing the openings, wherein the case comprises upper and lower portions, each comprising a first width W1 and a third width W3 being different from each other so that the openings having a second width W2 deviate a predetermined distance from a middle position of the case toward one side of the upper and lower portions, respectively, and the shutter moves toward a direction to expose the openings and allow the pick-up to access the disk, where a difference between the first width W1 and the third width W3 compensate for the deviation of the openings.

3. An apparatus, comprising:

a disk cartridge accommodating a disk and comprising:
 a case receiving the disk, wherein openings deviating a predetermined distance from a middle position of the case toward one side, and
 a shutter opening/closing the openings; and an adapter supporting the cartridge between first and second side walls, wherein a difference between widths of the first and second side walls compensate for the deviation of the openings.

4. The apparatus as recited in claim 3, wherein widths of the first and second side walls are the same.

5. The apparatus as recited in claim 3, wherein a difference in the widths of the first and second side walls is set to be same as the deviation of the openings from the middle position of the case so that when the cartridge is joined with the adapter, the deviation of the openings is offset by a difference in the widths and the openings are positioned at a middle position of the adapter.

6. A disk cartridge accommodating a disk, comprising:

a case comprising upper and lower portions forming a space to receive the disk, the case having openings and spindle receiving holes; and a shutter selectively opening/closing the openings and spindle receiving holes, wherein upper and lower portions, each comprises a first width W1 and a third width W3 being different from each other so that the openings having a second width W2 deviate a distance toward one side of the upper and lower portions, respectively, from corresponding center points of the spindle receiving holes, where a difference between the first width W1 and the third width W3 compensate for the deviation of the openings.

7. The disk cartridge as recited in claim 6, wherein:

the upper portion comprises a first section on one side of the opening formed through the upper portion and a second section on another side of the opening formed through the upper portion, the lower portion comprises a first section on one side of the opening formed through the lower portion and a second section on another side of the opening formed through the lower portion, the first section of the upper portion and the first section of the lower portion are same widths and opposite each other, and the second section of the upper portion and the second section of the lower portion are same widths and opposite each other.

8. The disk cartridge as recited in claim 7, wherein the widths of the first sections of the upper and the lower portions are different from the widths of the second sections of the upper and the lower portions.

9. The disk cartridge as recited in claim 7, wherein the widths of the first and second sections of the upper and the lower portions are same.

10. The disk cartridge as recited in claim 6, wherein the disk is a double-sided disk.

11. The disk cartridge as recited in claim 6, wherein the disk is a single-sided disk.

12. An apparatus, comprising:

a disk cartridge accommodating a disk comprising:
 a case receiving the disk and having openings formed to deviate a predetermined distance from a middle position of the case toward one side, and
 a shutter opening/closing the openings;

an opening lever; and an adapter comprising first and second side walls supporting the disk cartridge, the adapter comprising:
 an auxiliary shutter joined to the shutter of the disk cartridge and slid by the opening lever to open and close the shutter, wherein a difference between widths of the first and second side walls compensate for the deviation of the openings.

13. The apparatus as recited in claim 12, wherein widths of the first and second side walls are the same.

14. The apparatus as recited in claim 12, wherein the difference of the widths of the first and second side walls correspond to the deviation of the openings.

15. The apparatus as recited in claim 14, wherein the case comprises upper and lower portions forming a space to receive the disk.

16. The apparatus as recited in claim 15, wherein:

the upper portion comprises a first section on one side of one of the openings formed through the upper portion and a second section on another side of the one of the openings, the lower portion comprises a first section on one side of another of the openings formed through the lower portion and a second section on another side of the another of the openings, the first section of the upper portion and the first section of the lower portion are same widths and opposite each other, and the second section of the upper portion and the second section of the lower portion are same widths and opposite each other.

17. The apparatus as recited in claim 16, wherein the width of the first section of the upper portion and the lower portion is W1, the width of the second section of the upper portion and the lower portion is W3, and widths of the openings is W2, and widths of the first and second side walls of the adapter are L1 and L2 satisfying a following relationship: L1+W1=L2+W3.

18. The apparatus as recited in claim 14, wherein a difference in the widths of the first and second side walls is set to be same as the deviation of the openings from the middle position of the case so that when the cartridge is joined with the adapter, the deviation of the openings is offset by a difference in the widths and the openings are positioned at a middle position of the adapter.

19. An adapter receiving a disk cartridge comprising a case having openings deviating a predetermined distance from a middle position of the case toward one side and a shutter opening/closing the openings, the adapter comprising:

a first side wall having a width L1;

a second side wall having a width L2, wherein the disk cartridge is supported between the first and second side walls; and an auxiliary shutter joined to the shutter of the disk cartridge and slid by an opening lever to open and close the shutter, wherein a difference between widths L1 and L2 compensate for the deviation of the openings.

* * * * *

UNITED STATES PATENT AND TRADEMARK OFFICE
CERTIFICATE OF CORRECTION

PATENT NO. : 6,807,674 B2
DATED : October 19, 2004
INVENTOR(S) : Seok-jung Kim et al.

It is certified that error appears in the above-identified patent and that said Letters Patent is hereby corrected as shown below:

Title page,
Item [54], Title, replace with the following:
-- DISK CARTRIDGE WITH OPENING DEVIATED FROM A MIDDLE POSITION AND ADAPTER COMPENSATING FOR THE DEVIATION --
Item [57], ABSTRACT, replace with the following:

--An apparatus includes a disk cartridge accommodating a disk and an adapter. The apparatus includes a case of the disk cartridge receiving the disk and having openings, a shutter of the disk cartridge opening/closing the openings, and first and second side walls of the adapter supporting the disk cartridge. The case also includes upper and lower portions, each including a first width W1 and a third width W3 being different from each other so that the openings having a second width W2 deviate a predetermined distance from a middle position of the case toward one side of the upper and lower portions, respectively, where a difference between widths of the first and second side walls compensates for the deviation of the openings.--

Column 4, line 65 through Column 5, line 10,
Replace claim 1 with the following:

--1. An apparatus comprising a disk cartridge accommodating a disk and an adapter, the apparatus comprising:
 a case of the disk cartridge receiving the disk and having openings;
 a shutter of the disk cartridge opening/closing the openings; and
 first and second side walls of the adapter supporting the disk cartridge
 wherein the case comprises upper and lower portions, each comprising a first width W1 and a third width W3 being different from each other so that the openings having a second width W2 deviate a predetermined distance from a middle position of the case toward one side of the upper and lower portions, respectively, where a difference between widths of the first and second side walls compensate for the deviation of the openings.--

Column 5,
Lines 11-27, replace claim 2 with the following:

--2. An apparatus comprising a disk cartridge accommodating a disk in a recording/reproducing apparatus comprising a pick-up and an adapter, the apparatus comprising:
 a case of the disk cartridge receiving the disk and having openings to enable the pick-up access of the disk;
 a shutter of the disk cartridge opening/closing the openings; and
 first and second side walls of the adapter supporting the disk cartridge,
 wherein the case comprises upper and lower portions, each comprising a first width W1 and a third width W3 being different from each other so that the openings having a second width W2 deviate a predetermined distance from a middle position of the case toward one side of the upper and lower portions, respectively, and the shutter moves toward a direction to expose the openings and allow the pick-up to access the disk, where a difference between widths of the first and second side walls compensate for the deviation of the openings.--

UNITED STATES PATENT AND TRADEMARK OFFICE
CERTIFICATE OF CORRECTION

PATENT NO.    : 6,807,674 B2
DATED         : October 19, 2004
INVENTOR(S)   : Seok-jung Kim et al.

It is certified that error appears in the above-identified patent and that said Letters Patent is hereby corrected as shown below:

Column 5 (cont'd),
Lines 47-60, replace claim 6 with the following:

--6. An apparatus comprising a disk cartridge accommodating a disk and an adapter, the apparatus comprising:
    a case of the disk cartridge comprising upper and lower portions forming a space to receive the disk, the case having openings and spindle receiving holes;
    a shutter of the disk cartridge selectively opening/closing the openings and spindle receiving holes; and
        first and second side walls of the adapter supporting the disk cartridge,
        wherein upper and lower portions, each comprises a first width W1 and a third width W3 being different from each other so that the openings having a second width W2 deviate a distance toward one side of the upper and lower portions, respectively, from corresponding center points of the spindle receiving holes where a difference between widths of the first and second side walls compensate for the deviation of the openings.--

Signed and Sealed this

Third Day of May, 2005

JON W. DUDAS
*Director of the United States Patent and Trademark Office*